(12) United States Patent
Rogers et al.

(10) Patent No.: US 8,403,589 B2
(45) Date of Patent: Mar. 26, 2013

(54) BALL LOCK MOUNTING ARRANGEMENT

(76) Inventors: John Anthony Rogers, Dorset (GB);
David Simon Schofield, Dorset (GB)

( * ) Notice: Subject to any disclaimer, the term of this patent is extended or adjusted under 35 U.S.C. 154(b) by 155 days.

(21) Appl. No.: 12/919,402

(22) PCT Filed: Feb. 24, 2009

(86) PCT No.: PCT/US2009/034951
§ 371 (c)(1),
(2), (4) Date: Oct. 18, 2010

(87) PCT Pub. No.: WO2009/108616
PCT Pub. Date: Sep. 3, 2009

(65) Prior Publication Data
US 2011/0027014 A1     Feb. 3, 2011

(30) Foreign Application Priority Data

Feb. 26, 2008  (GB) ................... 0803445.6

(51) Int. Cl.
*F16B 21/00*    (2006.01)
(52) U.S. Cl. .................. 403/322.2; 81/177.85
(58) Field of Classification Search .............. 403/322.1, 403/322.2, 325; 81/177.85
See application file for complete search history.

(56) References Cited

U.S. PATENT DOCUMENTS

| | | | |
|---|---|---|---|
| 3,498,653 A | 3/1970 | McCreery | |
| 4,614,457 A * | 9/1986 | Sammon | 403/322.2 |
| 4,740,122 A * | 4/1988 | Glaser | 409/232 |
| 4,962,682 A * | 10/1990 | Rose et al. | 81/177.85 |
| 5,390,571 A * | 2/1995 | Fox et al. | 81/177.85 |
| 5,458,431 A * | 10/1995 | Ferreol-Ragotin | 403/322.2 |
| 6,006,632 A * | 12/1999 | Hsieh | 81/177.85 |
| 6,267,032 B1 * | 7/2001 | Hsieh | 81/177.85 |
| 6,823,762 B2 * | 11/2004 | Hu | 81/177.85 |
| 6,889,582 B2 * | 5/2005 | Wilhelm | 81/177.85 |

(Continued)

FOREIGN PATENT DOCUMENTS

| | | |
|---|---|---|
| DE | 20004718 U1 | 8/2000 |
| EP | 0572237 A1 | 1/1993 |

(Continued)

OTHER PUBLICATIONS

ISR for PCT/US2009/034951 mailed Jun. 15, 2009.

(Continued)

*Primary Examiner* — James Hewitt
(74) *Attorney, Agent, or Firm* — Lowe Hauptman Ham & Berner, LLP

(57) ABSTRACT

A paint gun assembly including a spray head and a connecting manifold. The spray head includes a bore terminating in a radially extending space of gradually increasing radius. The bore receives a shaft that has an axially extending bore which connects with radially extending bores in which balls are contained. The shaft also contains a plunger with a rounded end, engaging the balls. When forced into the axial bore, the plunger forces the balls into the radially extending bores and out into the tapered, radially extending space. The plunger engages a cam which is exposed at a surface of the manifold body and includes a hexagon drive to adjust the angular rotation of the cam using a suitable key. The manifold body provides a recess for receiving a retaining pin, whose end is received in the cam guide profile. Axial movement of the cam is resisted by a compression spring.

6 Claims, 3 Drawing Sheets

U.S. PATENT DOCUMENTS

| | | | |
|---|---|---|---|
| 7,377,137 B1 * | 5/2008 | Bednarz | 70/34 |
| 7,661,606 B2 | 2/2010 | Vacher | |
| 2010/0180734 A1 * | 7/2010 | Hsieh | 81/177.85 |

FOREIGN PATENT DOCUMENTS

| | | |
|---|---|---|
| EP | 1393814 A1 | 3/2004 |
| FR | 2795462 A1 | 12/2000 |
| GB | 843859 A | 8/1960 |
| WO | 2006108245 A1 | 10/2006 |

OTHER PUBLICATIONS

British Search Report for GB0803445.6 dated Jun. 11, 2008.

* cited by examiner

BALL LOCK MOUNTING ARRANGEMENT

RELATED APPLICATIONS

The present application is based on International Application Number PCT/US2009/034951, filed Feb. 24, 2009, and claims priority from, British Application Number GB0803445.6, filed Feb. 26, 2008.

The present invention relates to a ball lock mounting arrangement and in particular to a novel arrangement for locking body parts together which utilises a ball lock. The arrangement has particular application in the assembly of body parts of apparatus to be subjected to high pressure, for example, spray guns.

Ball locks are well known, such arrangements are, for example, widely used in the detachable connection of machine tools. An example of such an arrangement is described in U.S. Pat. No. 3,498,653.

Generally, a ball lock comprises a body having a shank with a centrally, axially extending bore into which is slideably received a ball. At one end, the shank further includes a plurality of radially extending bores which pass through the shank wall. The radially extending bores are no longer in length than the diameter of the balls they receive. The relative proportions of the balls and bores are such that, if the ball of the central bore is driven against the balls in the radial bores, the balls in the radial bores are caused to travel and protrude from the radial bores beyond the outer surface of the shank. Conventionally, axial movement and fixing of the centrally located ball is facilitated by an adjustment screw which is received through a tapped bore in the ball lock body. Appropriate adjustment of the screw forces the centrally located ball against the radially located balls, forcing the radially located balls radially outwards. The screw locks the balls in position. Reversal of the screw allows the balls to travel in the bores, retracting back inside the shank.

It will be appreciated the arrangement facilitates that the body may be received into the proximal end of a bore in a second body; the bore of the second body having a radially larger space at its distal end. Appropriate adjustment of the screw after insertion of the ball lock body causes the radially located balls to travel into the radially larger space and locks them in position thereby resisting axial withdrawal of the shank.

The present invention provides a novel adaptation of this arrangement which is particularly useful in connecting parts of a paint spray gun body. Other uses for the novel arrangement will no doubt occur to the skilled addressee.

In accordance with the present invention there is provided a connecting body for securing to a main body, the main body including a bore, the bore having a distal end which terminates in a radially larger space; the connecting body comprising a shank portion configured to be received in the bore in the main body and having a centrally, axially extending bore and a plurality of radially extending bores passing through the shank wall, a plurality of balls receivable in the radially extending bores and a round headed plunger received in the centrally axially extending bore such that when the plunger engages the balls, the balls are caused to travel through the radially extending bore and protrude into the radially larger space, rise and fall of the plunger being effected by a cam portion which is drivable from a position on the exposed surface of the connecting body when the connecting body is aligned for attachment to the main body.

In one useful application, the main body is the spray head of a spray gun and the connecting body a base manifold of a spray gun.

The cam is conveniently driven by a hexagon drive accessible at the exposed surface of the connecting body. An appropriate key can be provided to drive the cam into the desired position.

Preferably there are three balls, one in each of three radially extending bores and the radially extending bores are equally angularly spaced.

The radially larger space may be bounded by a tapered wall, the radius of the space increasing towards the distal end of the space. In such an arrangement, the balls can be forced outwards as the plunger is driven further into the shank. This eventually provides a tight clamping force between the two bodies.

A retaining pin engages with the guide profile of the cam to retain the position of the cam with respect to the plunger. Optionally, there is further included a cam spring which resists axial motion of the cam.

Desirably the cam guide profile is configured to provide three distinct phases; fully engaged, partial engaged and fully disengaged.

An embodiment of the invention will now be further described with reference to the following Figures in which.

Figure 1:
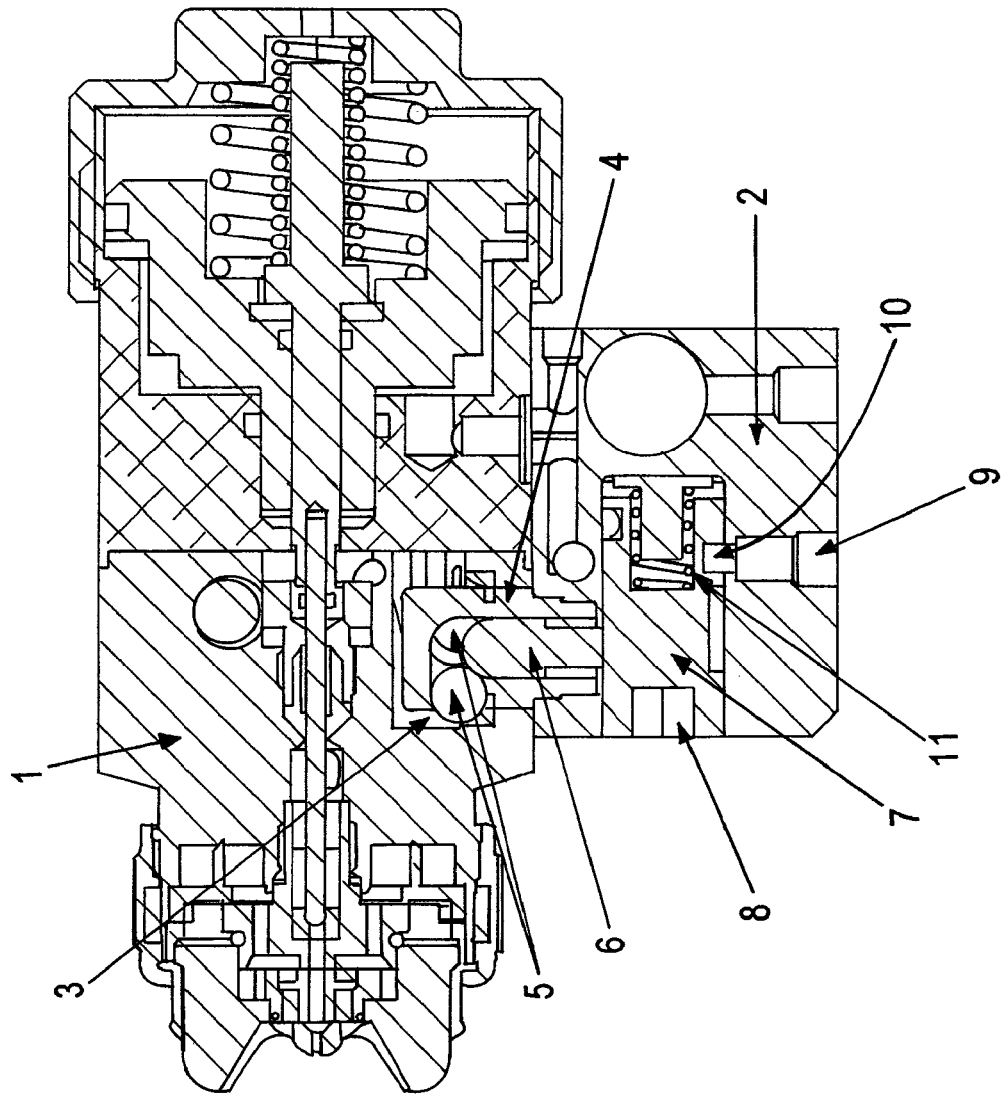
FIG. 1 shows in cross section an embodiment of a connecting body and a main body secured together in accordance with the invention.
Figure 2:
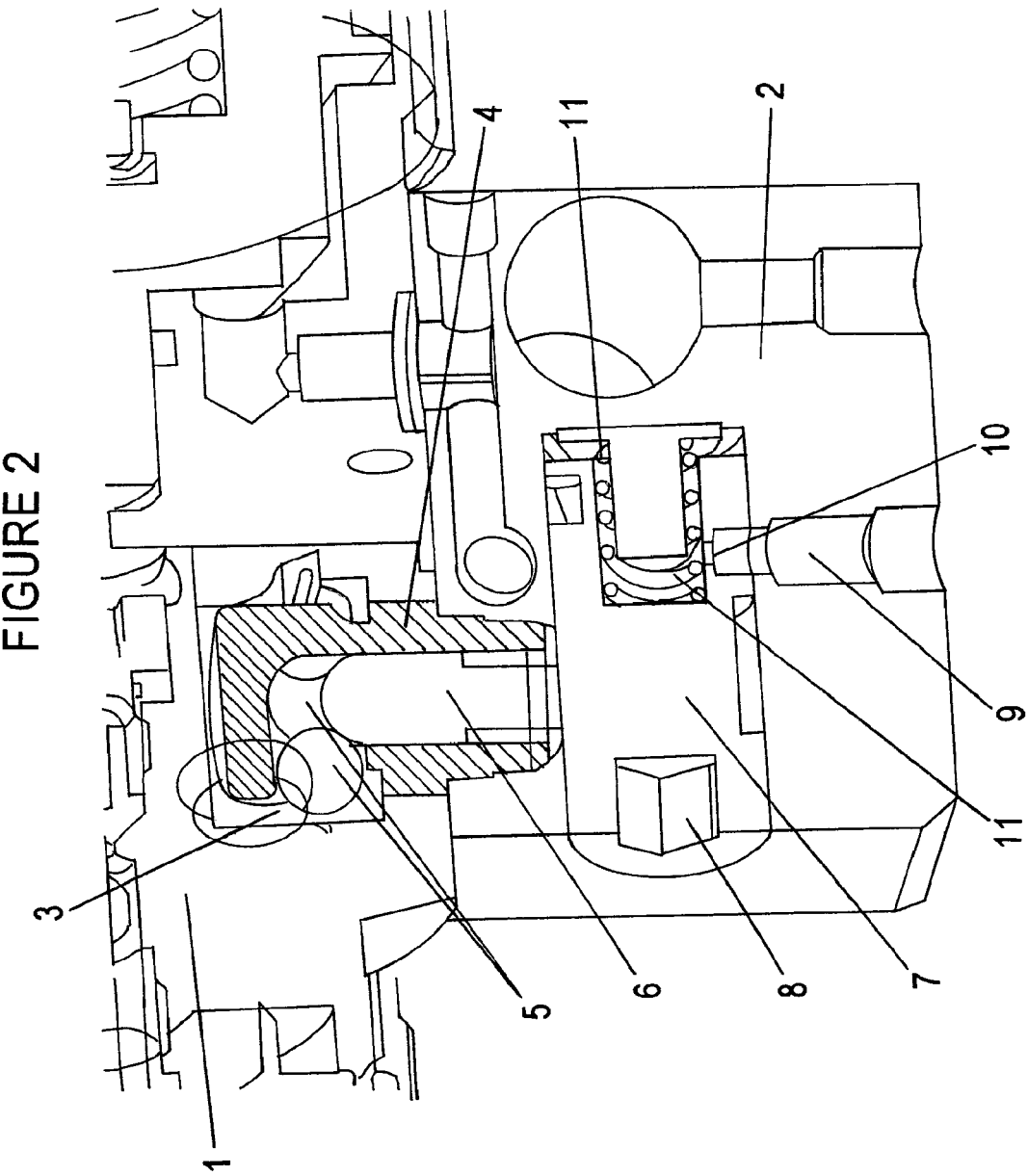
FIG. 2 shows the embodiment of FIG. 1 in a three dimensional view.

As can be seen from FIGS. 1 and 2 a paint gun assembly comprises two connected body parts, the spray head 1 and the connecting manifold 2. The spray head is provided with a bore which terminates in a radially extending space 3 of gradually increasing radius. Received in the bore is a shaft 4. The shaft has an axially extending bore which connects with radially extending bores in which balls 5 are contained. Received in the shaft is a plunger 6 which has a rounded end and which engages with the balls 5. When forced into the axial bore, the plunger 6 forces the balls 5 into the radially extending bores and out into the tapered, radially extending space 3.

Engaging with the plunger 6 in the manifold body 2 is a cam 7. The cam body 7 is exposed at a surface of the manifold body 2 and includes a hexagon drive 8 by means of which the angular rotation of the cam can be adjusted using a suitable key. The manifold body further includes a recess 9 for receiving a retaining pin (not shown). The end of the retaining pin is received in the cam guide profile 10. Axial movement of the cam 7 in its housing is further resisted by compression spring 11.

Figure 3:
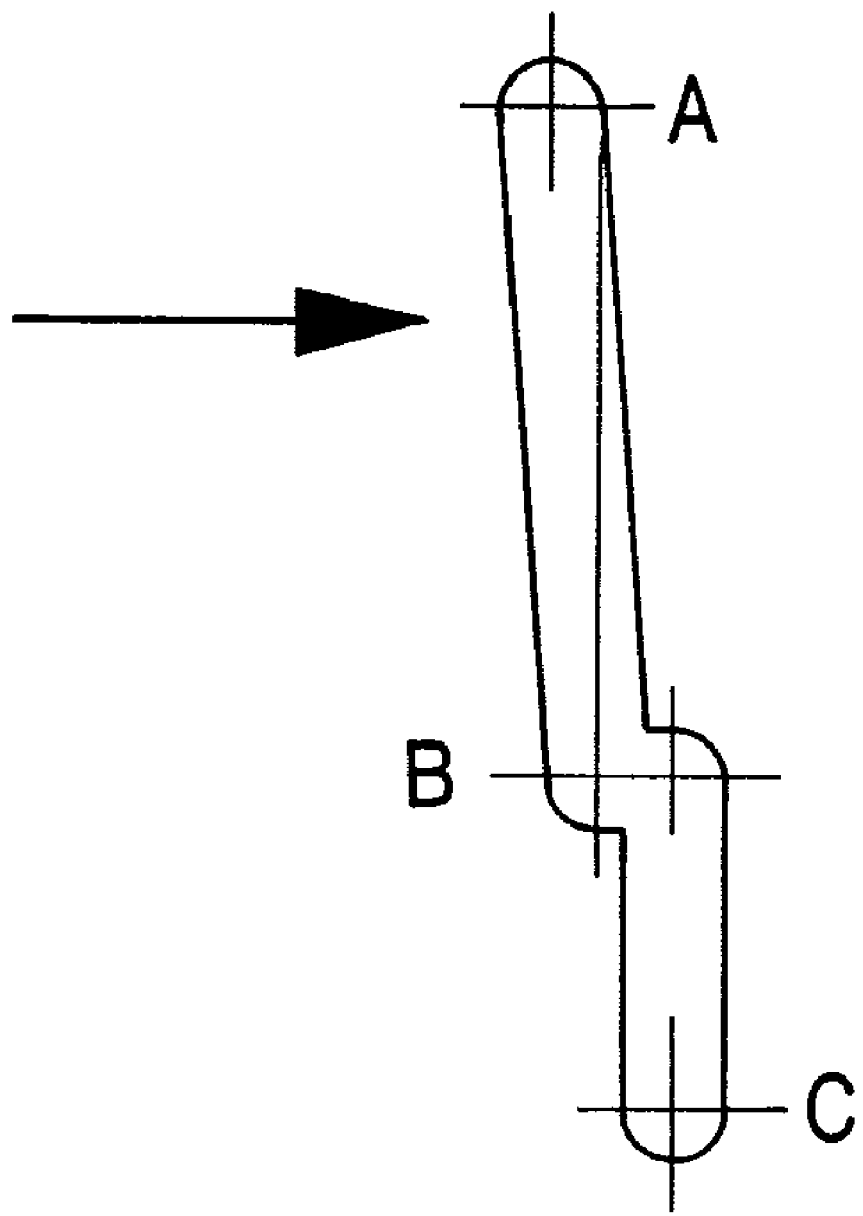
FIG. 3 shows a cam guide profile suitable for inclusion in the cam of the embodiment of FIG. 1 or 2.

FIG. 3 shows the guide profile of the cam 7. There are three distinct positions of the plunger which correspond with the positions A, B and C of the cam 7. In the Figure, the arrow represents a load on the cam 7 provided by spring 11.

When the cam engages with the plunger at position A, the spray head 1 and manifold 2 are tightly clamped together. At position B, the clamping force is partially released, the spray head and manifold are still secured together but there sufficient space between them to allow release of any pressure build up within the cavity of the gun. The balls 5 are held more loosely in the radially extending bores and can travel up the taper of the radially larger space allowing a small gap between the still secured manifold body 2 and spray head 1. The position is maintained by the spring force and a retaining pin which together create a stop position. At position C, the balls 5 are no longer forced through the radially extending bores and the spray head and manifold body can be separated. To arrive at position C from position B, the cam 7 must be pushed in an axial direction against the spring force and rotated.

It will of course be understood that many variations may be made to the above-described embodiment without departing from the scope of the present invention.

The invention claimed is:

1. A locking mechanism for removably securing a base manifold of a spray gun to a spray head of a spray gun, the spray head having a bore with an opening at a proximal end and a radially extending space at a distal end, comprising:
   a shank portion attached to said base manifold and dimensioned and configured to be received in said bore of said spray head, said shank portion having a centrally and axially extending bore with a closed end and a plurality of radially extending bores aligned with said radially extending space when said shank portion is in a fully inserted position,
   a plurality of balls receivable in the radially extending bores;
   a plunger having a rounded tip dimensioned and configured to be received in the centrally and axially extending bore such that when the plunger is pressed against the plurality of balls, each of said plurality of balls moves through a corresponding radially extending bore and protrudes into the radially extending space,
   a cam member having a longitudinal axis, said cam member being rotatable about said longitudinal axis and linearly slidable along said longitudinal axis for engaging a bottom portion of said plunger, wherein the rotation of said cam member around said longitudinal axis causes said plunger to move up and down, wherein the cam member has a guide profile configured to provide three distinct positions of the plunger corresponding to the engagement of the spray head and base manifold: fully engaged; partially engaged; fully disengaged.

2. The locking mechanism of claim 1, wherein the cam member is driveable by a hexagon drive accessible at an exposed surface of the connecting body.

3. The locking mechanism of claim 1, wherein said plurality of balls is three balls, one in each of said plurality of radially extending bores, and wherein the radially extending bores are equally angularly spaced.

4. The locking mechanism of claim 1, wherein the radially extending space is bounded by a tapered wall, the radius of the space increasing towards the distal end of the space.

5. The locking mechanism of claim 1, further including a retaining pin which engages with the cam member to retain the position of the cam with respect to the plunger.

6. The locking mechanism of claim 1, further comprising a spring which resists said linearly slidable motion of the cam member.

* * * * *